United States Patent
Kim et al.

(10) Patent No.: US 10,527,773 B2
(45) Date of Patent: Jan. 7, 2020

(54) BACKLIGHT UNIT FOR HOLOGRAPHIC DISPLAY APPARATUS AND HOLOGRAPHIC DISPLAY APPARATUS INCLUDING THE SAME

(71) Applicant: SAMSUNG ELECTRONICS CO., LTD., Suwon-si (KR)

(72) Inventors: Yunhee Kim, Seoul (KR); Jaeseung Chung, Suwon-si (KR); Hoon Song, Yongin-si (KR); Sunil Kim, Seoul (KR); Jungkwuen An, Suwon-si (KR)

(73) Assignee: SAMSUNG ELECTRONCIS CO., LTD., Suwon-si (KR)

( * ) Notice: Subject to any disclaimer, the term of this patent is extended or adjusted under 35 U.S.C. 154(b) by 85 days.

(21) Appl. No.: 15/659,787

(22) Filed: Jul. 26, 2017

(65) Prior Publication Data

US 2018/0149790 A1     May 31, 2018

(30) Foreign Application Priority Data

Nov. 28, 2016  (KR) .......................... 10-2016-0159420

(51) Int. Cl.
  F21V 7/04        (2006.01)
  F21V 8/00        (2006.01)
  G02B 27/22       (2018.01)

(52) U.S. Cl.
  CPC ......... *G02B 6/0028* (2013.01); *G02B 6/0026* (2013.01); *G02B 6/0055* (2013.01); *G02B 6/0066* (2013.01); *G02B 6/0078* (2013.01); *G02B 27/225* (2013.01)

(58) Field of Classification Search
  CPC ...... G02B 6/00; G02B 6/0011; G02B 6/0013; G02B 6/0023; G02B 6/0026; G02B 6/0028; G02B 6/0033; G02B 6/0035; G02B 6/0066; G02B 6/0068; G02B 6/0073; G02B 6/0075; G02B 6/0078; G02B 27/225
  USPC .................................. 362/611–613, 615–627
  See application file for complete search history.

(56) References Cited

U.S. PATENT DOCUMENTS

| 5,644,427 | A  | * | 7/1997  | Omori .................. G02B 27/225 359/464 |
| 5,854,872 | A  |   | 12/1998 | Tai |
| 7,907,342 | B2 | * | 3/2011  | Simmonds ......... G02B 27/0081 345/7 |
| 8,493,662 | B2 |   | 7/2013  | Noui |
| 2013/0128611 | A1 |  | 5/2013  | Akutsu et al. |
| 2018/0032030 | A1 |  | 2/2018  | Kim et al. |

FOREIGN PATENT DOCUMENTS

| CN | 204445828 U      | 7/2015 |
| JP | 2001502072 A     | 2/2001 |
| KR | 10-2018-0012058 A | 2/2018 |

* cited by examiner

*Primary Examiner* — Jason M Han
(74) *Attorney, Agent, or Firm* — Sughrue Mion, PLLC

(57) ABSTRACT

A backlight unit and a holographic display apparatus that includes a backlight unit are provided. The backlight unit includes a light source, a first light guide plate for guiding a light beam emitted by the light source in a first direction, a second light guide plate for guiding the light beam incident via the first light guide plate in a second direction, and an output/input coupler that is disposed between the first light guide plate and the second light guide plate.

18 Claims, 4 Drawing Sheets

BACKLIGHT UNIT FOR HOLOGRAPHIC DISPLAY APPARATUS AND HOLOGRAPHIC DISPLAY APPARATUS INCLUDING THE SAME

CROSS-REFERENCE TO RELATED APPLICATION

This application claims priority from Korean Patent Application No. 10-2016-0159420, filed on Nov. 28, 2016, in the Korean Intellectual Property Office, the disclosure of which is incorporated herein by reference in its entirety.

BACKGROUND

1. Field

Exemplary embodiments relate to backlight units with increased light efficiency and holographic display apparatuses including the same.

2. Description of the Related Art

As methods of implementing a three-dimensional image, a stereoscopic method and an auto-stereoscopic method are widely used and commercialized. The stereoscopic method includes a polarizing glass method and a shutter glass method, and the auto-stereoscopic method includes a lenticular method and a parallax barrier method. Since these methods use the phenomenon of a binocular parallax between two eyes, an increase in the number of viewing points is limited, and further, a viewer may feel fatigue due to an inconsistency between a sense of depth recognized by the brain of the viewer and focus of the eyes of the viewer.

As a three-dimensional image display method that is capable of providing full parallax and consistency between a sense of depth recognized by the brain of a viewer and focus of the eyes of the viewer, a holographic display method is gradually being put into practice. The holographic display method utilizes the principle that, when reference light is irradiated to a hologram pattern that has recorded therein an interfering pattern obtained by causing object light reflected from an original object and the reference light interfere with each other, and thus, the reference light is diffracted by the hologram pattern, an image of the original object is reproduced. According to a conventional holographic display method that is currently being used, a computer generated hologram (CGH) is provided to a spatial light modulator as an electrical signal instead of obtaining a hologram pattern by directly exposing an original object to light. As the spatial light modulator forms a hologram pattern according to an input CGH signal and diffracts reference light, a three-dimensional image may be generated.

However, in order to implement a complete holographic display method, a spatial light modulator with very high resolution and very high data throughput are required. Recently, a binocular hologram method for providing holographic images only to respective viewing regions that correspond to both eyes of a viewer has been proposed as a way of alleviating conditions related to data throughput and resolution. For example, only a holographic image that has a viewing point that corresponds to a left-eye viewing region of a viewer and a holographic image that has a viewing point that corresponds to a right-eye viewing region of the viewer are generated and provided to the left eye and the right eye of the viewer, respectively. In this case, since holographic images for the remaining viewing points do not have to be generated, data throughput may be significantly reduced, and a resolution condition for a spatial light modulator may be satisfied even with currently commercialized display apparatuses.

SUMMARY

Provided are backlight units for holographic display apparatuses, which have increased light efficiency.

Provided are holographic display apparatuses with increased light efficiency.

Additional aspects will be set forth in part in the description which follows and, in part, will be apparent from the description, or may be learned by practice of the presented exemplary embodiments.

According to an aspect of an exemplary embodiment, a backlight device includes: a light source configured to emit a light beam; a first light guide plate configured to guide the light beam emitted by the light source and to expand the light beam in a first direction; a first input coupler configured to cause the light beam to propagate into the first light guide plate; a first output coupler configured to direct the light beam to an outside of the first light guide plate; a second light guide plate configured to guide the light beam after the light beam has passed through the first output coupler and to expand the light beam in a second direction; and a second output coupler configured to direct the light beam to an outside of the second light guide plate.

The first output coupler may be disposed between the first light guide plate and the second light guide plate.

The first output coupler may be further configured to operate as an input coupler with respect to the second light guide plate.

The second light guide plate may include an incident surface that is inclined at a first angle with respect to an exit surface, and the first light guide plate and the first output coupler may be coupled to the incident surface.

The first light guide plate and the second light guide plate may be disposed on a same plane.

The first output coupler may have a two-dimensional grating structure.

The backlight device may further include a refractive element or a diffractive element that is disposed between the first output coupler and the second light guide plate.

The backlight device may further include a mirror that is disposed on a side surface of the second light guide plate opposite the first output coupler, wherein the mirror may be inclined at a second angle with respect to an exit surface of the second light guide plate.

The backlight device may further include a beam deflector that is disposed between the light source and the first light guide plate, wherein the beam deflector may be configured to change a travelling direction of light.

The backlight device may further include a pre-expander that is disposed between the light source and the first light guide plate, wherein the pre-expander may be configured to expand light.

The backlight device may further include a third light guide plate and at least one additional light source configured to irradiate light toward the third light guide plate, wherein the second light guide plate may include a first surface that is disposed to face the first light guide plate, and the third light guide plate may be disposed on the first surface.

The backlight device may further include a second input coupler configured to couple the light irradiated from the at least one additional light source to the third light guide plate, and a third output coupler that is disposed between the second light guide plate and the third light guide plate.

According to an aspect of another exemplary embodiment, a backlight device includes: a light source configured to emit a light beam; a first light guide plate configured to guide the light beam emitted by the light source in a first direction; a second light guide plate configured to guide the light beam that is incident thereto via the first light guide plate in a second direction; and an output/input coupler that is disposed between the first light guide plate and the second light guide plate, wherein the output/input coupler is configured to facilitate a propagation of the light beam from the first light guide plate so as to be incident on the second light guide plate.

According to an aspect of another exemplary embodiment, a holographic display apparatus includes: a light source configured to emit a light beam; a first light guide plate configured to guide the light beam emitted by the light source and to expand the light beam in a first direction; an input coupler configured to cause the light beam to propagate into the first light guide plate; a first output coupler configured to direct the light beam to an outside of the first light guide plate; a second light guide plate configured to guide the light beam after the light beam has passed through the first output coupler and to expand the light beam in a second direction; a second output coupler configured to direct the light beam to an outside of the second light guide plate; and a spatial light modulator configured to reproduce a holographic image by diffracting incident light.

The holographic display apparatus may further include a Fresnel lens configured to focus the holographic image reproduced by the spatial light modulator.

The holographic display apparatus may further include a beam deflector that is disposed between the light source and the input coupler.

The holographic display apparatus may further include an eye tracking device configured to sense a location of pupils of a user, wherein the eye tracking device may be coupled to the beam deflector.

BRIEF DESCRIPTION OF THE DRAWINGS

These and/or other aspects will become apparent and more readily appreciated from the following description of exemplary embodiments, taken in conjunction with the accompanying drawings in which.

DETAILED DESCRIPTION

Figure 1:
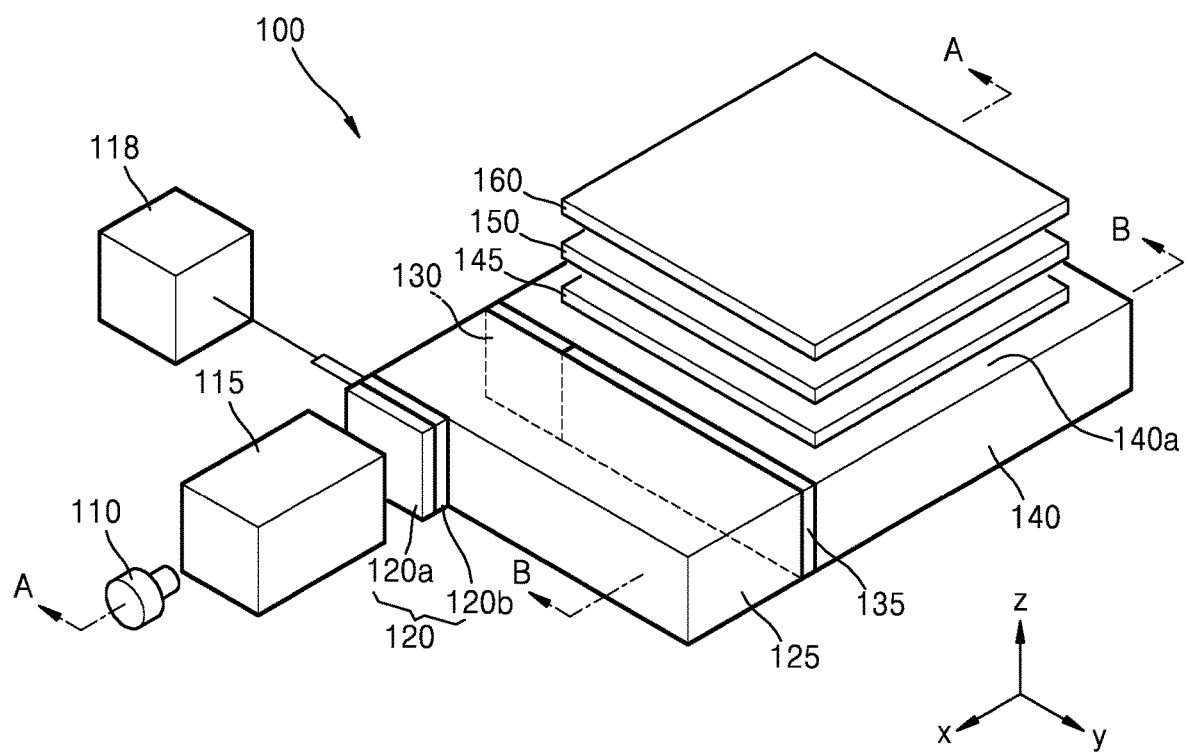
FIG. 1 is a perspective view of a holographic display apparatus, according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. Also, when an element is referred to as being "on" another element in the below description of a layer structure, the element may be directly on/under/at the left of/at the right of the other element, or the element may be on/under/at the left of/at the right of the other element without contact.

In the drawings, sizes of elements may be exaggerated for clarity and convenience of description. It will be understood that, although the terms such as first and second may be used herein to describe various elements, these elements should not be limited by these terms. These terms are only used to distinguish one element from another.

As used herein, the singular forms "a", "an", and "the" are intended to include the plural forms as well, unless the context clearly indicates otherwise. It will be further understood that, when a portion is referred to as "including" an element, the portion may further include another element, rather than excluding the other element, unless otherwise described.

Also, a term, such as " . . . unit" or "module", used herein refers to a unit that implements at least one function or operation, which may be implemented as hardware or software or may be implemented as a combination of hardware and software.

Figure 2:
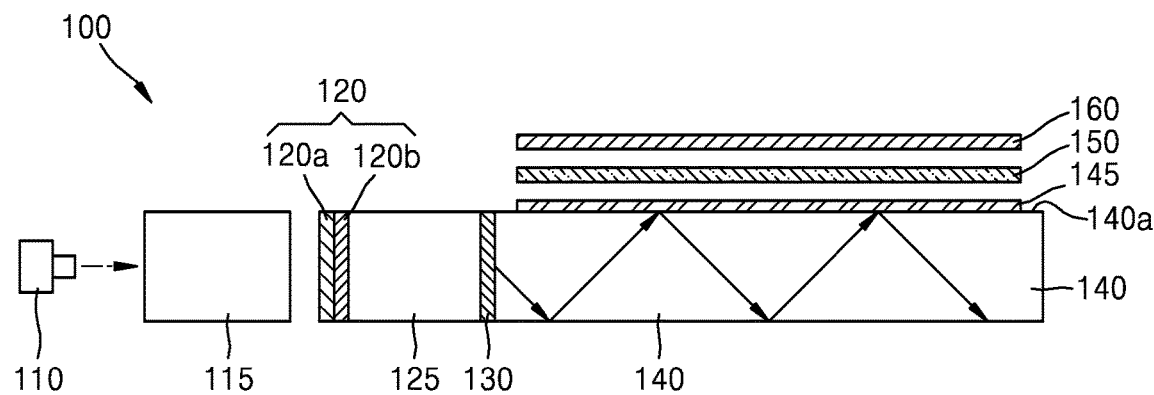
FIG. 2 is a cross-sectional view taken along line A-A of FIG. 1.
Figure 3:
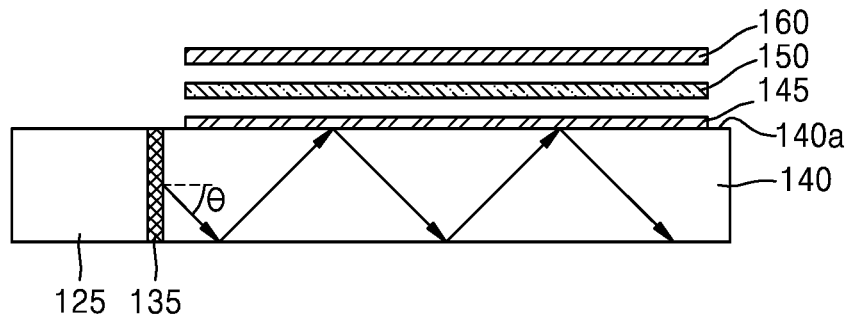
FIG. 3 is a cross-sectional view taken along line B-B of FIG. 1.

FIG. 1 is a perspective view of a holographic display apparatus 100, according to an exemplary embodiment. FIG. 2 is a cross-sectional view taken along line A-A of FIG. 1. FIG. 3 is a cross-sectional view taken along line B-B of FIG. 1.

The holographic display apparatus 100 may include a light source 110, a first light guide plate 125 that is configured for guiding a light beam emitted from the light source 110 and expanding the light beam in a first direction, and a second light guide plate 140 that is configured for expanding the light beam in a second direction.

The light source 110 may provide a coherent light beam. The light source 110 may include a laser diode. However, when light has a certain level of spatial coherence, the light may be diffracted and modulated by a spatial light modulator and thus may have coherence, and accordingly, any other light source may be used provided that the light source is capable of emitting light that has a certain level of spatial coherence.

In general, a holographic display apparatus may provide respective holographic images with different viewing points to the left eye and the right eye of a viewer according to the binocular hologram mechanism. For example, the holographic display apparatus may provide a left-eye holographic image to a left-eye viewing region of a viewer and may provide a right-eye holographic image with a viewing point, which is different from that of the left-eye holographic image, to a right-eye viewing region of the viewer.

Unlike stereoscopic left-eye and right-eye images, the left-eye holographic image and the right-eye holographic image provided by the holographic display apparatus may cause a three-dimensional effect to be experienced by a viewer even individually, merely by virtue of the different viewing points. According to the stereoscopic mechanism, when a left-eye two-dimensional image and a right-eye two-dimensional image with different viewing points are respectively recognized by the left eye and the right eye of a viewer, a three-dimensional effect occurs as a result of binocular parallax. Accordingly, under the stereoscopic mechanism, no three-dimensional effect is created with just one of the left-eye image and the right-eye image, and the viewer may feel fatigue due to inconsistency between a sense of depth recognized by the brain of the viewer and focus of the eyes of the viewer. Conversely, the holographic display apparatus respectively forms a left-eye holographic image and a right-eye holographic image for predetermined spatial locations, that is, a left-eye viewing region and a right-eye viewing region of a viewer, and thus, may provide consistency between a sense of depth recognized by the brain of the viewer and focus of the eyes of the viewer, and may also provide full parallax. The holographic display apparatus 100 according to the present exemplary embodiment may provide only binocular viewing points. In this case, since a viewer may recognize only two viewing points with his or her left eye and right eye, data throughput may be reduced by removing information regarding the remaining viewing points except for information about the viewing points that may be recognized by the viewer.

An input coupler 130 that is configured for coupling a light beam to the inside of the first light guide plate 125 may be disposed on a portion of a surface of the first light guide plate 125. The input coupler 130 may also be disposed at a side where the light beam is incident on the first light guide plate 125. A first output coupler 135 that is configured for outputting the light beam may be on the first light guide plate 125. The first output coupler 135 and the input coupler 130 may be disposed on the same surface of the first light guide plate 125. However, the present exemplary embodiment is not limited thereto, and the first output coupler 135 and the input coupler 130 may be respectively disposed on different surfaces of the first light guide plate 125. In this case, the input coupler 130 and the first output coupler 135 may be respectively disposed on opposite surfaces of the first light guide plate 125.

The first output coupler 135 may be disposed between the first light guide plate 125 and the second light guide plate 140. For example, the first output coupler 135 may be disposed at an interface between the first light guide plate 125 and the second light guide plate 140. The first output coupler 135 may be integrated with the first light guide plate 125 and the second light guide plate 140.

The input coupler 130 may guide the light beam to travel in the first light guide plate 125 in one direction via total reflection. When the light beam travels through the first light guide plate 125 and is incident on the first output coupler 135, a portion of the light beam is incident on the second light guide plate 140 via the first output coupler 135, and the rest of the light beam may be reflected to travel through the first light guide plate 125. As a result of this process, the light beam is incident on the second light guide plate 140 via the entire surface of the first light guide plate 125, and accordingly, the light beam may expand in a direction while traveling through the first light guide plate 125. The input coupler 130, the first light guide plate 125, and the first output coupler 135 may change the light beam into line light. For example, the line light may refer to light that has a cross-section which has a relatively small width and a relatively large length.

Each of the input coupler 130 and the first output coupler 135 may be a diffractive optical element that is configured for diffracting and transmitting a portion of the light beam. For example, each of the input coupler 130 and the first output coupler 135 may have a grating structure.

A second output coupler 145 may be disposed on a surface of the second light guide plate 140. In this aspect, the second output coupler 145 may be disposed on an exit surface 140a of the second light guide plate 140. The exit surface 140a may refer to a surface through which the light beam propagates to the outside as the light beam travels through the second light guide plate 140. The second output coupler 145 may be a diffractive optical element that is configured for diffracting and transmitting a portion of the light beam. For example, the second output coupler 145 may have a grating structure. In this regard, the light source 110, the input coupler 130, the first light guide plate 125, the first output coupler 135, the second light guide plate 140, and the second output coupler 145 may together constitute a backlight unit (also referred to herein as a "backlight device").

The light beam emitted from the first light guide plate 125 via the first output coupler 135 may be incident on the second light guide plate 140. Accordingly, since the first output coupler 135 outputs the light beam from the first light guide plate 125, and at the same time, enables the light beam to be incident on the second light guide plate 140 and be coupled thereto, the first output coupler 135 may be an output and input coupler (also referred to herein as an "output/input coupler"). However, for convenience, the first output coupler 135 is named an output coupler. The first output coupler 135 may have a grating pattern which is perpendicular to a light guiding direction of the first light guide plate 125. However, the present exemplary embodiment is not limited thereto, and the first output coupler 135 may have a two-dimensional grating structure configured to adjust an output direction of the light beam that propagates from the first light guide plate 125 and an input direction of the light beam that propagates into the second light guide plate 140. For example, the first output coupler 135 may have a grating pattern which is parallel to a direction Z that is perpendicular to a light guiding direction, that is, a Y-axis, at a side that is relatively close to the first light guide plate 125, and a grating pattern which is parallel to a direction Y that is perpendicular to a light guiding direction, that is, a direction −X, at a side that is relatively close to the second light guide plate 140.

The holographic display apparatus may improve image quality according to collimation of a light beam and coherence. A pre-expander 115 may be further provided between the light source 110 and the first light guide plate 125 to collimate the light beam. The pre-expander 115 may primarily expand the light beam by collimating point light that propagates from the light source 110. The pre-expander 115 may include, for example, a collimating lens. As a divergence angle of the light beam approaches zero (0) degrees due to collimation of the light beam, coherence thereof may increase. Accordingly, quality of a holographic image may be improved by collimation of the light beam by the pre-expander 115.

A beam deflector 120 may be further provided between the light source 110 and the first light guide plate 125. The beam deflector 120 may be disposed between the pre-expander 115 and the first light guide plate 125.

The beam deflector 120 may change a direction of the light beam irradiated from the light source 110. According to a location of pupils of a viewer, the beam deflector 120 may adjust a location of the light beam which is outputted. The holographic display apparatus 100 according to the present exemplary embodiment may further include an eye tracking device 118 that is configured for tracking a location of pupils of the viewer.

The eye tracking device 118 may detect a change in a location of at least one pupil of a user by sensing the location of one or both pupils of the user. The eye tracking device 118 may include an infrared camera, a visible ray camera, or any other type of sensor. For example, the eye tracking device 118 may obtain an image of the user via a camera, etc., may detect pupils of the user within the image, and may analyze a location thereof. Also, eyes of the user may not be found due to eye blinking, an obstacle, or the like, and in such a case, a location of the eyes may be projected, and movement of the location of the eyes may be predicted based on a motion of the user. The eye tracking device 118 may track a change in the location of pupils of the user in real time, and may control the beam deflector 120 to adjust a visual field location of an image to a changed location of pupils of the user, based on sensed information, so that the image may be displayed correctly with respect to a location of eyes of the viewer. The beam deflector 120 may control a beam direction, based on an electrical signal. The beam deflector 120 may be, for example, a liquid crystal deflector.

The beam deflector 120 may include, for example, a horizontal beam deflector 120a and a vertical beam deflector 120b.

The horizontal beam deflector 120a may be configured to deflect incident light so as to horizontally adjust a location of a holographic image to be reproduced. The vertical beam deflector 120b may be configured to deflect incident light so as to vertically adjust a location of a holographic image to be reproduced. The beam deflector 120 may be disposed to face the input coupler 130. An incidence angle of a light beam incident on the input coupler 130 may be adjusted by the horizontal beam deflector 120a and the vertical beam deflector 120b.

By diffracting incident light, the beam deflector 120 may create two light beams that propagate at different angles. The two light beams are incident on the input coupler 130 at different angles, and also travel at different angles in the first light guide plate 125. As a result, when the two light beams are emitted through the first output coupler 135, the second light guide plate 140, and the second output coupler 145, the two light beams may respectively travel to a left eye and a right eye of the viewer.

In the holographic display apparatus 100 according to the present exemplary embodiment, the first light guide plate 125 and the second light guide plate 140 may be disposed on a same plane. Accordingly, the holographic display apparatus 100 may have a small overall thickness. Also, the light beam primarily expanded by the pre-expander 115 is configured to be incident in a direction of a relatively thin side surface of the first light guide plate 125, and thus, an area which is primarily expanded may be minimized. In this regard, a direction of a side surface of the first light guide plate 125 and the second light guide plate 140 may refer to a direction which is opposite a surface adjacent to the exit surface 140a through which the light beam is emitted from the second light guide plate 140. Accordingly, the pre-expander 115 may have a reduced size. Thus, a size of the beam deflector 120 on which the light beam expanded by the pre-expander 115 is incident may also be reduced.

A travelling path of a light beam in the holographic display apparatus 100 is described as follows. The light beam emitted from the light source 110 may travel through the first light guide plate 125 via the input coupler 130 and be outputted via the first output coupler 135, and the light beam outputted from the first output coupler 135 may be directly inputted to the second light guide plate 140. In addition, the light beam may be outputted via the second output coupler 145. During this process, the light beam passes through the input coupler 130, the first output coupler 135, and the second output coupler 145 in this stated order. Passing through an input coupler or output coupler may involve a degradation of light efficiency of an incident light beam. Accordingly, a reduction of light efficiency may be minimized by decreasing the number of input couplers and output couplers, and as a result, light efficiency may be increased. In the present exemplary embodiment, since the first output coupler 135 also serves as an input coupler with respect to the second light guide plate 140, light loss due to the input coupler with respect to the second light guide plate 140 may decrease.

Further, the first light guide plate 125, the first output coupler 135, and the second light guide plate 140 are assembled together integrally, and accordingly, no other components that might otherwise be disposed between the first output coupler 135 and the second light guide plate 140 are required. In this regard, "integrally" may refer to a plurality of components combined as one body. Accordingly, manufacturing costs may be reduced, an overall volume may be decreased, and light loss that may be caused when light passes through a component may be decreased by decreasing the overall number of components.

Referring to FIG. 3, a light beam guided via the first light guide plate 125 may be diffracted by the first output coupler 135 at angle θ and be incident on the second light guide plate 140. The angle θ refers to an angle of inclination with respect to the exit surface 140a of the second light guide plate 140. The angle θ may refer to an angle of diffraction. The angle of diffraction θ may be smaller than $(90-\theta_c)$ in order to guide the light beam to the second light guide plate 140. In this regard, $\theta_c$ may refer to a critical angle of the second light guide plate 140. The critical angle refers to an incidence angle at which total reflection occurs when light propagates from a material with a relatively high refractive index to a material with a relatively low refractive index. Gratings of the first output coupler 135 may be designed so as to satisfy this condition.

For example, since, at the first light guide plate 125, a light beam travels in a first direction (i.e., a horizontal direction, the direction Y of FIG. 1) of the first light guide plate 125, the input coupler 130 may include gratings that are arranged to be parallel to a second direction (i.e., a vertical direction, the direction Z of FIG. 1). The first output coupler 135 may include gratings that are arranged to be parallel to the second direction (i.e., the vertical direction, the direction Z of FIG. 1) as the input coupler 130 does, and also may include gratings that are arranged to be parallel to the horizontal direction (i.e., the direction Y of FIG. 1). The second output coupler 145 may include gratings that are arranged to be parallel to the direction Y. Alternatively, the first output coupler 135 may include a two-dimensional grating pattern configured to satisfy both of output coupling of the first light guide plate 125 and input coupling with respect to the second light guide plate 140.

A Fresnel lens 150 and a spatial light modulator 160 may be disposed to be adjacent to the second output coupler 145. The Fresnel lens 150 may be configured to focus the light beam outputted from the second output coupler 145 to a predetermined space. In particular, the Fresnel lens 150 may focus the light beam expanded by the first light guide plate 125 and the second light guide plate 140 to the left eye and the right eye of the viewer. Not only a Fresnel lens but also a holographic optical element may be used to focus a light beam. The spatial light modulator 160 may form a hologram pattern that has an interference pattern for modulating incident light. The spatial light modulator 160 may include, for example, a liquid crystal display panel. Incident light may be diffracted and modulated by the hologram pattern formed by the spatial light modulator 160, and thus, a holographic image may be reproduced. The Fresnel lens 150 may be disposed between the second output coupler 145 and the spatial light modulator 160 or adjacent to the spatial light modulator 160.

The holographic display apparatus 100 according to the present exemplary embodiment may be manufactured as a thin type apparatus by disposing the first light guide plate 125 and the second light guide plate 140 in a same plane and including an output coupler with respect to the first light guide plate 125 and an input coupler with respect to the second light guide plate 140 as a single component. In addition, light efficiency may be increased by introducing an output and input coupler (also referred to herein as an "output/input coupler"). Thus, a high-quality holographic three-dimensional image may be displayed by using the holographic display apparatus 100. In addition, the backlight unit according to the exemplary embodiment may reproduce a holographic image by providing coherent collimating light.

Figure 4:
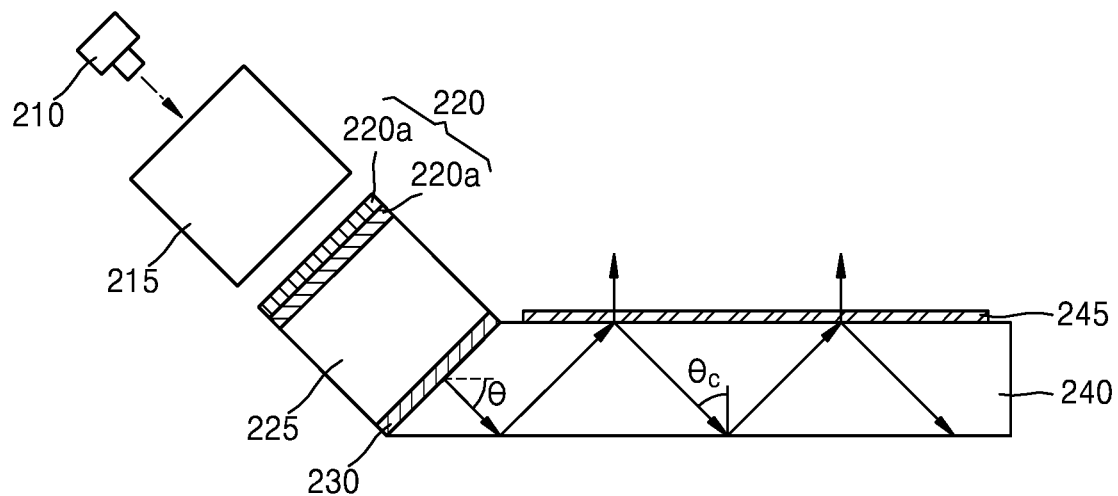
FIG. 4 is a cross-sectional view of a backlight unit, according to another exemplary embodiment.
Figure 5:
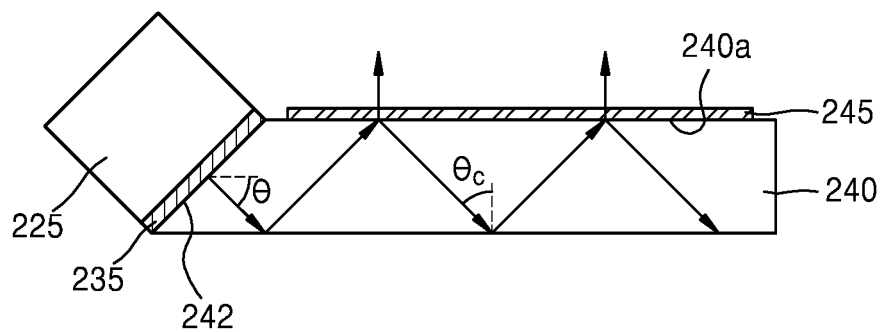
FIG. 5 is a cross-sectional view of a backlight unit, according to another exemplary embodiment.

FIGS. 4 and 5 each illustrate a backlight unit (also referred to herein as a "backlight device") 200, according to another exemplary embodiment. The backlight unit 200 may include a light source 210, a first light guide plate 225 that is configured for guiding a light beam emitted by the light source 210 and expanding the light beam in a first direction, and a second light guide plate 240 that is configured for expanding the light beam in a second direction. FIG. 4 is a cross-sectional view along a direction in which the light source 210 is present (refer to the line A-A direction of FIG. 1), and FIG. 5 is a cross-sectional view along a direction in which the light source 210 is not present (refer to the line B-B direction of FIG. 1).

The light source 210 may be configured to emit a coherent light beam. The light source 210 may include a laser diode.

The first light guide plate 225 may be inclined relative to the second light guide plate 240 and coupled thereto. Referring to FIG. 4, an input coupler 230 may be disposed between the first light guide plate 225 and the second light guide plate 240, and referring to FIG. 5, a first output coupler 235 may be disposed between the first light guide plate 225 and the second light guide plate 240. The second light guide plate 240 may include an inclined surface 242 at a surface on which light is incident, and the input coupler 230 and the first output coupler 235 may be disposed on the inclined surface 242. A second output coupler 245 may be disposed on an exit surface of the second light guide plate 240.

The first light guide plate 225 is coupled to the second light guide plate 240 at a predetermined angle with respect to the second light guide plate 240, and thus, a light beam guided via the first light guide plate 225 may be diffracted at angle θ by the first output coupler 235 and be incident on the second light guide plate 240. The angle θ refers to an angle of inclination with respect to an exit surface 240a of the second light guide plate 240. The angle θ may refer to an angle of diffraction. The angle of diffraction θ may be smaller than $(90-\theta_c)$ in order to guide the light beam to the second light guide plate 240. In this regard, $\theta_c$ may refer to a critical angle of the second light guide plate 240. In the present exemplary embodiment, the first light guide plate 225 is coupled to the second light guide plate 240 and is inclined relative to the second light guide plate 240, and thus, a light beam incident on the second light guide plate 240 may be inclined with respect to the second light guide plate 240. Accordingly, in this case, the first output coupler 235 may have a one-dimensional grating structure that is configured for diffracting a light beam in one direction. A pre-expander 215 may be further provided to be disposed between the light source 210 and the first light guide plate 225. The pre-expander 215 may be, for example, a collimating lens that is configured for collimating light in order to primarily expand point light that propagates from the light source 210. A beam deflector 220 may be further provided to be disposed between the pre-expander 215 and the first light guide plate 225. The beam deflector 220 may include, for example, a horizontal beam deflector 220a and a vertical beam deflector 220b.

The horizontal beam deflector 220a may be configured to deflect incident light so as to horizontally adjust a location of a holographic image to be reproduced. The vertical beam deflector 220b may be configured to deflect incident light so as to vertically adjust a location of a holographic image to be reproduced.

Figure 6:
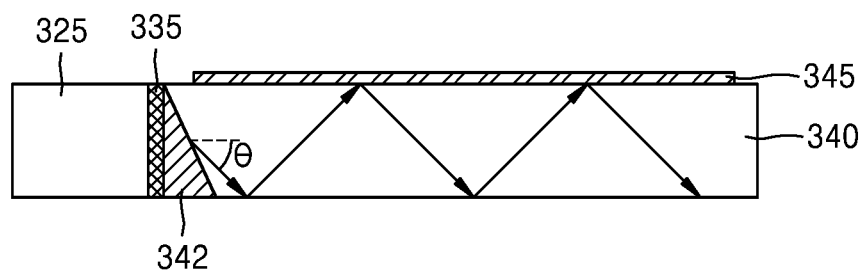
FIG. 6 is a cross-sectional view of a backlight unit, according to another exemplary embodiment.

FIG. 6 is a cross-sectional view of a backlight unit (also referred to herein as a "backlight device") 300, according to another exemplary embodiment. In the present exemplary embodiment, only a cross-sectional view along the direction of line B-B of FIG. 1 without a light source is illustrated. The light source 110, the pre-expander 115, the beam deflector 120, and the input coupler 130 illustrated in FIG. 1 may be applied in substantially the same manner in the present exemplary embodiment.

The backlight unit 300 may include a first light guide plate 325 which is configured for expanding a light beam in a first direction, a second light guide plate 340 which is configured for expanding the light beam in a second direction, and a first output coupler 335 that is disposed between the first light guide plate 325 and the second light guide plate 340.

The first light guide plate 325 and the second light guide plate 340 may be disposed in a same plane. A light path changing device 342 that is configured for changing a travelling direction of light may be disposed on an incident surface of the second light guide plate 340. The light path changing device 342 may include, for example, a refractive element that is configured for refracting light or a diffractive element that is configured for diffracting light. The refractive element may be a prism. The diffractive element may be a prism array or a blazed grating. The light path changing device 342 may facilitate a propagation of a light beam so as to be incident on the second light guide plate 340 while being inclined at a predetermined angle θ. While the light beam incident on and inclined relative to the second light guide plate 340 travels through the second light guide plate 340, the light beam may be partially emitted through a second output coupler 345 and may be partially reflected to travel through the second light guide plate 340.

Figure 7:
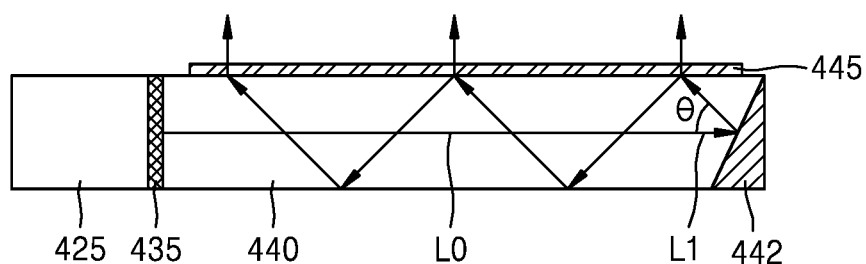
FIG. 7 is a cross-sectional view of a backlight unit, according to another exemplary embodiment.

FIG. 7 is a cross-sectional view of a backlight unit (also referred to herein as a "backlight device") 400, according to another exemplary embodiment. In the present exemplary embodiment, only a cross-sectional view in the direction of line B-B of FIG. 1 without a light source is illustrated. The light source 110, the pre-expander 115, the beam deflector 120, and the input coupler 130 illustrated in FIG. 1 may be applied in substantially the same manner as in the present exemplary embodiment.

The backlight unit 400 may include a first light guide plate 425 that is configured for expanding a light beam in a first direction, a second light guide plate 440 that is configured for expanding the light beam in a second direction, and a first output coupler 435 that is disposed between the first light guide plate 425 and the second light guide plate 440.

The first light guide plate 425 and the second light guide plate 440 may be disposed in a same plane. A mirror 442 inclined at a predetermined angle may be disposed on a side surface, from among side surfaces of the second light guide plate 440, that is opposite the first output coupler 435.

A light beam L0 which is incident on the second light guide plate 440 via the first output coupler 435 may be directly directed to the mirror 442 without a reflection process. Due to the mirror 442, a light beam may be inclined at a predetermined angle θ and reflected to a surface of the second light guide plate 440. While the light beam incident on and inclined relative to the second light guide plate 440 travels through the second light guide plate 440, the light beam may be partially emitted through a second output coupler 445 and may be partially reflected to travel through the second light guide plate 440. At the second light guide plate 440 illustrated in FIG. 7, light may be guided in an opposite direction (i.e., a direction from the right side to the left side of FIG. 7) as compared with that of FIG. 6. Although FIG. 7 illustrates an example in which the mirror 442 has a cross-sectional shape of a right-angled triangle, the mirror 442 may have a cross-sectional shape of a reverse right-angled triangle. In this aspect, in some exemplary embodiments, the mirror 442 may be disposed to be inclined in an opposite direction as compared with that illustrated in FIG. 7.

Figure 8:
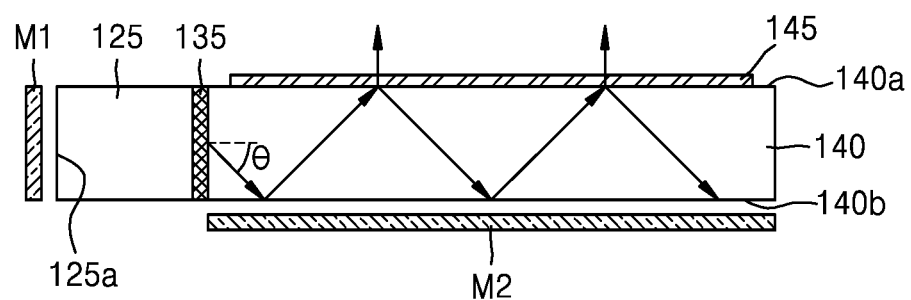
FIG. 8 illustrates an example in which the backlight unit of FIG. 3 further includes a reflecting unit.

FIG. 8 illustrates an example in which the backlight unit of FIG. 3 further includes a reflecting unit (also referred to herein as a "reflector"). A first reflecting unit M1 may be further provided on a first surface 125a of the first light guide plate 125 so as to face the first output coupler 135. The first reflecting unit M1 may reduce a leakage of light through the first surface 125a from among light beams travelling in the first light guide plate 125. A second reflecting unit M2 may be further provided on a second surface 140b of the second light guide plate 140 opposite the second output coupler 145. The second reflecting unit M2 may reduce a leakage of light through the second surface 140b from among light beams travelling in the second light guide plate 140.

Although FIG. 8 illustrates an example in which the first reflecting unit M1 and the second reflecting unit M2 are respectively spaced apart from the first light guide plate 125 and the second light guide plate 140, the first reflecting unit M1 and the second reflecting unit M2 may be respectively attached to the first light guide plate 125 and the second light guide plate 140.

Figure 9:
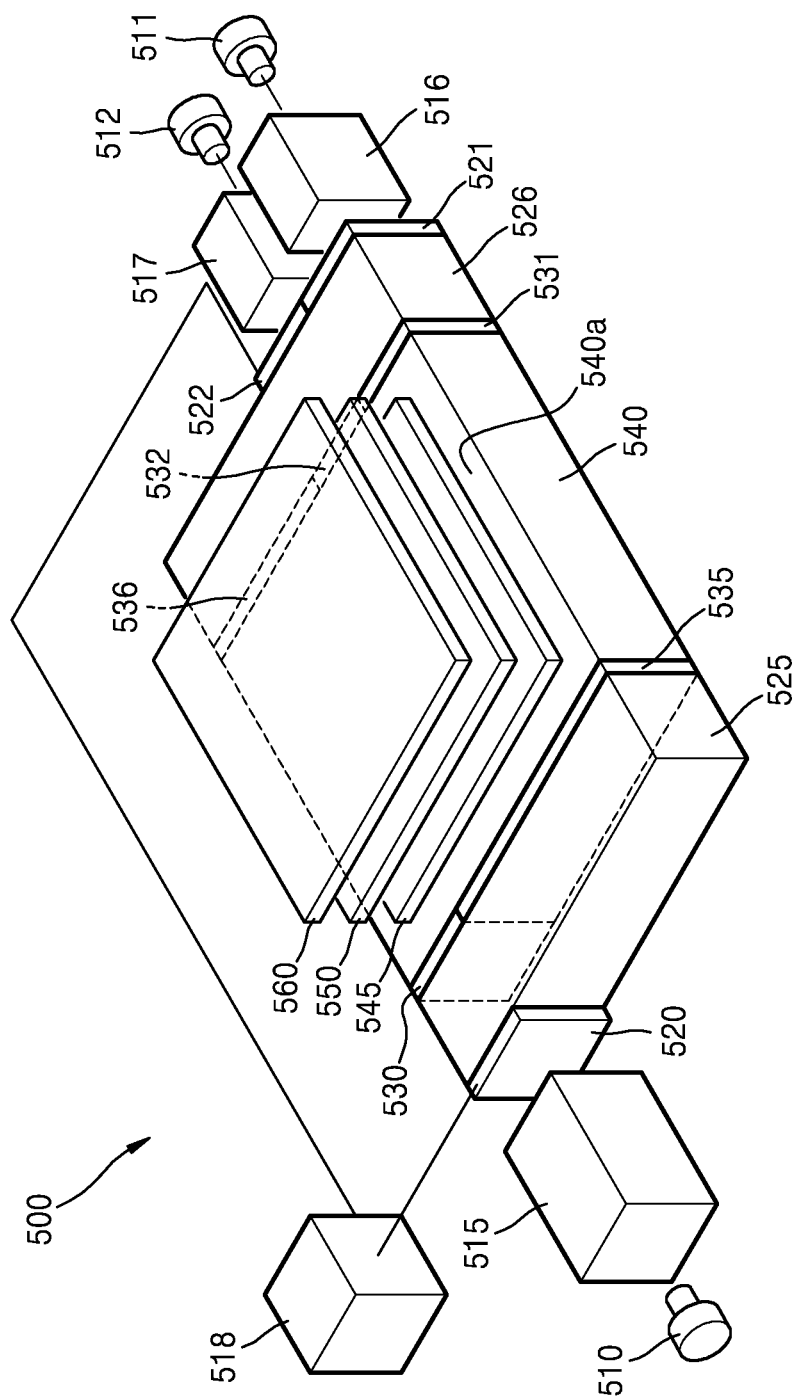
FIG. 9 is a perspective view of a holographic display apparatus, according to another exemplary embodiment.

FIG. 9 is a perspective view of a holographic display apparatus 500, according to another exemplary embodiment. The holographic display apparatus 500 may display a color image by using light beams that have a plurality of wavelengths.

The holographic display apparatus 500 may include a first light source 510, a second light source 511, a third light source 512, a first light guide plate 525 that is configured for guiding a first light beam that propagates from the first light source 510 and expanding the first light beam in a first direction, a second light guide plate 540 that is configured for expanding the first light beam in a second direction, and a third light guide plate 526 that is configured for guiding a second light beam that propagates from the second light source 511 and a third light beam that propagates from the third light source 512 and expanding the second and third light beams in the first direction.

The first light source 510 may irradiate light with a first wavelength, the second light source 511 may irradiate light with a second wavelength, and the third light source 512 may irradiate light with a third wavelength. For example, the first light source 510 may irradiate red light, the second light source 511 may irradiate green light, and the third light source 512 may irradiate blue light. Each of the first light source 510, the second light source 511, and the third light source 512 may provide a coherent light beam and may include, for example, a laser diode. However, when light exhibits a certain level of spatial coherence, the light may be diffracted and modulated by a spatial light modulator and thus may have coherence, and accordingly, any other light source may be used provided that the light source is capable of emitting light exhibiting a certain level of spatial coherence.

The first light guide plate 525 and the third light guide plate 526 may be respectively disposed on opposite surfaces of the second light guide plate 540.

A first input coupler 530 that is configured for causing the first light beam to propagate into the first light guide plate 525 may be disposed on a portion of a surface of the first light guide plate 525. The first input coupler 530 may also be disposed at a side where the first light beam is incident on the first light guide plate 525. A first output coupler 535 that is configured for outputting the first light beam to the second light guide plate 540 may be disposed on the first light guide plate 525. The first output coupler 535 and the first input coupler 530 may be disposed in the same surface of the first light guide plate 525. However, the present exemplary embodiment is not limited thereto, and the first output coupler 535 and the first input coupler 530 may be respectively disposed on different surfaces of the first light guide plate 525. In this case, the first input coupler 530 and the first output coupler 535 may be respectively disposed on opposite surfaces of the first light guide plate 525.

The first output coupler 535 may be disposed between the first light guide plate 525 and the second light guide plate 540. For example, the first output coupler 535 may be disposed at an interface between the first light guide plate 525 and the second light guide plate 540. The first output coupler 535 may be integrated with the first light guide plate 525 and the second light guide plate 540.

A second input coupler 531 that is configured for causing the second light beam to propagate into the third light guide plate 526 may be disposed on a portion of a surface of the third light guide plate 526. The second input coupler 531 may also be disposed at a side where the second light beam is incident on the third light guide plate 526. A third input coupler 532 that is configured for causing the third light beam to propagate into the third light guide plate 526 may be disposed on a portion of the surface of the third light guide plate 526. The third input coupler 532 may be adjacent to the second input coupler 531. The third input coupler 532 may also be disposed at a side where the third light beam is incident on the third light guide plate 526.

A third output coupler 536 that is configured for outputting the second light beam and the third light beam to the second light guide plate 540 may be disposed on the third light guide plate 526. The third output coupler 536 and the second and third input couplers 531 and 532 may be disposed on the same surface of the third light guide plate 526.

The third output coupler 536 may be disposed between the second light guide plate 540 and the third light guide plate 526. For example, the third output coupler 536 may be disposed at an interface between the second light guide plate 540 and the third light guide plate 526. The third output coupler 536 may be integrated with the second light guide plate 540 and the third light guide plate 526.

The second input coupler 531 may guide the second light beam to travel in the third light guide plate 526 via total reflection. When the second light beam travels through the third light guide plate 526 and is incident on the third output coupler 536, the second light beam may be incident on the second light guide plate 540 via the third output coupler 536. The third input coupler 532 may guide the third light beam to travel in the third light guide plate 526 in a direction via total reflection. When the third light beam travels through the third light guide plate 526 and is incident on the third output coupler 536, the third light beam may be incident on the second light guide plate 540 via the third output coupler 536.

Accordingly, each of the second light beam and the third light beam may expand in a respective direction while traveling through the third light guide plate 526. The second input coupler 531, the third light guide plate 526, and the third output coupler 536 may convert the second light beam into line light, and the third input coupler 532, the third light guide plate 526, and the third output coupler 536 may convert the third light beam into line light. Each of the second input coupler 531, the third input coupler 532, and the third output coupler 536 may be a diffractive optical element that is configured for diffracting and transmitting a portion of a light beam. For example, each of the second input coupler 531, the third input coupler 532, and the third output coupler 536 may have a grating structure.

A second output coupler 545 may be disposed on a surface of the second light guide plate 540. In particular, the second output coupler 545 may be disposed on an exit surface 540*a* of the second light guide plate 540. The exit surface 540*a* may refer to a surface through which a light beam propagates to the outside as the light beam travels through the second light guide plate 540. The second output coupler 545 may be a diffractive optical element that is configured for diffracting and transmitting a portion of the light beam. For example, the second output coupler 545 may have a grating structure. The second output coupler 545 is commonly applied to light beams that have different wavelengths and thus may have a grating pattern that varies based on a wavelength.

The second light beam and the third light beam emitted from the third light guide plate 526 via the third output coupler 536 may be incident on the second light guide plate 540. Accordingly, since the third output coupler 536 outputs the second light beam and the third light beam from the third light guide plate 526, and at the same time enables the second light beam and the third light beam to be incident on the second light guide plate 540 and be coupled thereto, the third output coupler 536 may be an output and input coupler (also referred to herein as an "output/input coupler").

FIG. 9 illustrates an example in which the first light source 510 is disposed at one side of the second light guide plate 540, and the second light source 511 and the third light source 512 are disposed at the other side of the second light guide plate 540 opposite to that of the first light source 510. However, the present exemplary embodiment is not limited thereto, and the first light source 510, the second light source 511, and the third light source 512 may be disposed in respectively different directions or may all be in the same direction. The number of input couplers and output couplers may vary according to the arrangement of light sources.

A first pre-expander 515 may be further provided between the first light source 510 and the first light guide plate 525 and configured to collimate the first light beam. The first pre-expander 515 may primarily expand the first light beam by collimating point light that propagates from the first light source 510. The first pre-expander 515 may include, for example, a collimating lens. As a divergence angle of the first light beam approaches zero (0) degrees due to collimation of the first light beam, coherence thereof may increase. Accordingly, the quality of a holographic image may be improved through collimation of the first light beam by the first pre-expander 515. A second pre-expander 516 may be further provided between the second light source 511 and the third light guide plate 526, and a third pre-expander 517 may be further provided between the third light source 512 and the third light guide plate 526. Each of the second pre-expander 516 and the third pre-expander 517 may perform substantially the same function as the first pre-expander 515.

A first beam deflector 520 may be further provided between the first light source 510 and the first light guide plate 525. The first beam deflector 520 may be disposed between the first pre-expander 515 and the first light guide plate 525. The first beam deflector 520 may be configured to change a direction of the first light beam irradiated from the first light source 510. A second beam deflector 521 may be further provided between the second light source 511 and the third light guide plate 526. The second beam deflector 521 may be disposed between the second pre-expander 516 and the third light guide plate 526. The second beam deflector 521 may be configured to change a direction of the second light beam irradiated from the second light source 511. A third beam deflector 522 may be further provided between the third light source 512 and the third light guide plate 526. The third beam deflector 522 may be disposed between the third pre-expander 517 and the third light guide plate 526. The third beam deflector 522 may be configured to change a direction of the third light beam irradiated from the third light source 512.

The first beam deflector 520, the second beam deflector 521, and the third beam deflector 522 may be configured to adjust respective locations of the first light beam, the second light beam, and the third light beam which are outputted based on a location of pupils of a viewer.

The holographic display apparatus 500 according to the present exemplary embodiment may further include an eye tracking device 518 that is configured for tracking the location of one or both pupils of the viewer. The eye tracking device 518 may be connected to the first beam deflector 520, the second beam deflector 521, and the third beam deflector 522 and may control the first beam deflector 520, the second beam deflector 521, and the third beam deflector 522 based on the location of pupils of the viewer sensed by the eye tracking device 518, and thereby an image may be displayed correctly with respect to a location of eyes of the viewer. Each of the first beam deflector 520, the second beam deflector 521, and the third beam deflector 522 may be configured to control a beam direction, based on an electrical signal. Each of the first beam deflector 520, the second beam deflector 521, and the third beam deflector 522 may be, for example, a liquid crystal deflector. Each of the first beam deflector 520, the second beam deflector 521, and the third beam deflector 522 may include, for example, a horizontal beam deflector and a vertical beam deflector.

A Fresnel lens 550 and a spatial light modulator 560 may be disposed to be adjacent to the second output coupler 545. The Fresnel lens 550 may be configured to focus each of the first light beam, the second light beam, and the third light beam outputted from the second output coupler 545 to a predetermined space. In particular, the Fresnel lens 550 may be configured to focus the first light beam, the second light beam, and the third light beam expanded by the first light guide plate 525, the second light guide plate 540, and the third light guide plate 526 to a left eye and a right eye of the viewer. The spatial light modulator 560 may form a hologram pattern that has an interference pattern for modulating incident light. The spatial light modulator 560 may include, for example, a liquid crystal display panel. Incident light may be diffracted and modulated by the hologram pattern formed by the spatial light modulator 560, and thus, a holographic image may be reproduced. The Fresnel lens 550 may be disposed between the second output coupler 545 and the spatial light modulator 560 or adjacent to the spatial light modulator 560.

In the holographic display apparatus 500 according to the present exemplary embodiment, the first light guide plate 525, the second light guide plate 540, and the third light guide plate 526 may be disposed in a same plane. Accordingly, the holographic display apparatus 500 may have a small overall thickness. Further, the first, second, and third light beams primarily expanded by the first, second, and third pre-expanders 515, 516, and 517 are configured to be incident in a direction toward relatively thin sides of the first light guide plate 525 and the third light guide plate 526, and thus, an area which is primarily expanded may be minimized. Accordingly, a respective size of each of the first, second, and third pre-expanders 515, 516, and 517 may be reduced. Thus, a size of the first, second, and third beam deflectors 520, 521, and 522 on which the first, second, and third light beams expanded by the first, second, and third pre-expanders 515, 516, and 517 are incident may also be reduced.

Still further, the first light beam may pass through the first input coupler 530, the first output coupler 535, and the second output coupler 545 in this stated order. The second light beam may pass through the second input coupler 531, the third output coupler 536, and the second output coupler 545 in this stated order. The third light beam may pass through the third input coupler 532, the third output coupler 536, and the second output coupler 545 in this stated order. Passing through an input coupler or output coupler may involve degradation of light efficiency of an incident light beam. Accordingly, a reduction of light efficiency may be minimized by using an input coupler and an output coupler which are integrated in a single body as in the present exemplary embodiment and decreasing the number of couplers, and as a result, light efficiency may be increased. In the present exemplary embodiment, since each of the first output coupler 535 and the third output coupler 536 also serves as an input coupler with respect to the second light guide plate 540, a corresponding light loss due to an input coupler with respect to the second light guide plate 540 may decrease.

According to one or more of the disclosed exemplary embodiments, a backlight unit may increase light efficiency by using an input coupler and an output coupler in one body. Further, an output and input coupler may be provided to be disposed between two light guide plates so that the backlight unit may be small and thin.

It shall be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by persons having ordinary skill in the art that various changes in form and details may be made therein without departing from the spirit and scope as defined by the following claims.

What is claimed is:

1. A backlight device comprising:
    a light source configured to emit a light beam;
    a first light guide plate configured to guide the light beam emitted by the light source and to expand the light beam in a first direction;
    a first input coupler configured to cause the light beam to propagate into the first light guide plate;
    a first output coupler configured to direct the light beam to an outside of the first light guide plate;
    a second light guide plate configured to guide the light beam after the light beam has passed through the first output coupler and to expand the light beam in a second direction; and
    a second output coupler configured to direct the light beam to an outside of the second light guide plate,
    wherein the first input coupler and the first output coupler are disposed adjacent to each other on a same plane between the first light guide plate and the second light guide plate.

2. The backlight device of claim 1, wherein the first output coupler is further configured to operate as an input coupler with respect to the second light guide plate.

3. The backlight device of claim 1, wherein the second light guide plate comprises an incident surface that is inclined at a first angle with respect to an exit surface, wherein each of the first light guide plate and the first output coupler is coupled to the incident surface.

4. The backlight device of claim 1, wherein each of the first light guide plate and the second light guide plate is disposed on a same plane.

5. The backlight device of claim 4, wherein the first output coupler has a two-dimensional grating structure.

6. The backlight device of claim 4, further comprising one from among a refractive element and a diffractive element that is disposed between the first output coupler and the second light guide plate.

7. The backlight device of claim 4, further comprising a mirror that is disposed on a side surface of the second light guide plate opposite the first output coupler,
    wherein the mirror is inclined at a second angle with respect to an exit surface of the second light guide plate.

8. The backlight device of claim 1, further comprising a beam deflector that is disposed between the light source and the first light guide plate,
    wherein the beam deflector is configured to change a travelling direction of light.

9. The backlight device of claim 1, further comprising a pre-expander that is disposed between the light source and the first light guide plate,
    wherein the pre-expander is configured to expand light.

10. The backlight device of claim 1, further comprising a third light guide plate and at least one additional light source configured to irradiate light toward the third light guide plate,
    wherein the second light guide plate comprises a first surface that is disposed to face the first light guide plate, and wherein the third light guide plate is disposed on the first surface.

11. The backlight device of claim 10, further comprising a second input coupler configured to couple the light irradiated from the at least one additional light source to the third light guide plate, and a third output coupler that is disposed between the second light guide plate and the third light guide plate.

12. A backlight device comprising:
a light source configured to emit a light beam;
a first light guide plate configured to guide the light beam emitted by the light source in a first direction;
a second light guide plate configured to guide the light beam that is incident thereto via the first light guide plate in a second direction; and
an output/input coupler that is disposed between the first light guide plate and the second light guide plate,
wherein the output/input coupler comprises:
a first portion configured to cause the light beam to propagate into the first light guide plate; and
a second portion configured to facilitate a propagation of the light beam from the first light guide plate so as to be incident on the second light guide plate.

13. The backlight device of claim 12, wherein the output/input coupler is integrated with the first light guide plate and the second light guide plate and disposed at an interface therebetween.

14. The backlight device of claim 12, wherein the second light guide plate comprises an inclined incident surface, and wherein the first light guide plate is coupled to the incident surface in an inclined manner.

15. The backlight device of claim 12, further comprising at least one from among a refractive element and a diffractive element that is disposed between the output/input coupler and the second light guide plate.

16. A holographic display apparatus comprising:
a light source configured to emit a light beam;
a first light guide plate configured to guide the light beam emitted by the light source and to expand the light beam in a first direction;
an input coupler configured to cause the light beam to propagate into the first light guide plate;
a first output coupler configured to direct the light beam to an outside of the first light guide plate;
a second light guide plate configured to guide the light beam after the light beam has passed through the first output coupler and to expand the light beam in a second direction;
a second output coupler configured to direct the light beam to an outside of the second light guide plate; and
a spatial light modulator configured to reproduce a holographic image by diffracting incident light,
wherein the input coupler and the first output coupler are disposed adjacent to each other on a same plane between the first light guide plate and the second light guide plate.

17. The holographic display apparatus of claim 16, further comprising a Fresnel lens configured to focus the holographic image reproduced by the spatial light modulator.

18. The holographic display apparatus of claim 16, further comprising a beam deflector that is disposed between the light source and the first light guide plate, and an eye tracking device configured to sense a location of at least one pupil of a user,
wherein the eye tracking device is coupled to the beam deflector.

* * * * *